(12) United States Patent
Bloebaum

(10) Patent No.: US 6,295,023 B1
(45) Date of Patent: Sep. 25, 2001

(54) METHODS, MOBILE STATIONS AND SYSTEMS FOR ACQUIRING GLOBAL POSITIONING SYSTEM TIMING INFORMATION

(75) Inventor: Leland Scott Bloebaum, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/489,108

(22) Filed: Jan. 21, 2000

(51) Int. Cl.$^7$ .................................................. H04B 7/185
(52) U.S. Cl. ...................... 342/357.06; 701/213
(58) Field of Search .................... 342/357.06, 357.12, 342/352; 701/213

(56) References Cited

U.S. PATENT DOCUMENTS

| | | | |
|---|---|---|---|
| 4,445,118 | 4/1984 | Taylor et al. | 343/357 |
| 5,099,245 * | 3/1992 | Sagey | 342/357 |
| 5,418,538 | 5/1995 | Lau | 342/357 |
| 5,663,734 | 9/1997 | Krasner | 342/357 |
| 5,663,735 | 9/1997 | Eshenbach | 342/357 |
| 5,812,087 | 9/1998 | Krasner | 342/357 |
| 5,841,396 | 11/1998 | Krasner | 342/357 |
| 5,920,284 * | 7/1999 | Victor | 342/357.01 |
| 6,028,887 * | 2/2000 | Harrison et al. | 375/206 |
| 6,031,490 * | 2/2000 | Forssen et al. | 342/457 |
| 6,078,284 * | 6/2000 | Levanon | 342/357.16 |
| 6,081,229 * | 6/2000 | Soliman et al. | 342/357.05 |

OTHER PUBLICATIONS

Len Sheynblat, et al., Time Recovery Via Pattern Match Technology, T1P1.5/99–225rl, Jun. 4, 1999.
Scott Bloebaum, Evaluation Worksheet for Assisted GPS, T1P1.5/98–132r2, Jun. 1, 1998.

* cited by examiner

Primary Examiner—Dao Phan
(74) Attorney, Agent, or Firm—Myers Bigel Sibley & Sajovec

(57) ABSTRACT

Methods, systems and mobile stations are provided which determine GPS timing by collecting energy from transmitted signals from one and preferably more acquired satellites to determine a single timing value, which may increase sensitivity. In addition, the receiver devices may use the entire navigation message from each satellite to obtain timing information which may further improve sensitivity and possibly remove latency from having to wait for the time-of-week (TOW) field to be received in the GPS satellite transmission. This is preferably accomplished by maximizing a single delay metric created based on expected (known in advance from some source) and actual (received) navigation symbols from the acquired satellites. As a result, position fixes may possibly be obtained under disadvantaged conditions where the signal quality from the GPS satellites is poor. Furthermore, the timing information obtained pursuant to the present invention does not require a timing relationship between GPS and communication network time.

35 Claims, 9 Drawing Sheets

METHODS, MOBILE STATIONS AND SYSTEMS FOR ACQUIRING GLOBAL POSITIONING SYSTEM TIMING INFORMATION

BACKGROUND OF THE INVENTION

The present invention relates to position computation methods and systems, and more particularly, to methods and systems for obtaining assistance information from a communication network for use in position computation. Wireless communication systems (networks) are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook,* edited by Gibson and published by CRC Press (1996).

FIG. 1 illustrates a conventional terrestrial wireless communication system 20 that may implement any one of the aforementioned wireless communications standards. The wireless system may include one or more wireless mobile terminals (stations) 22 that communicate with a plurality of cells 24 served by base stations 26 and a mobile telephone switching office (MTSO) 28. Although only three cells 24 are shown in FIG. 1, a typical cellular radiotelephone network may comprise hundreds of cells, and may include more than one MTSO 28 and may serve thousands of wireless mobile terminals 22.

The cells 24 generally serve as nodes in the communication system 20, from which links are established between wireless mobile stations (terminals) 22 and a MTSO 28, by way of the base stations 26 servicing the cells 24. Each cell 24 will have allocated to it one or more dedicated control channels and one or more traffic channels. The control channel is a dedicated channel used for transmitting cell identification and paging information. The traffic channels carry the voice and data information. Through the communication system 20, a duplex radio communication link 30 may be effected between two wireless mobile stations 22 or between a wireless mobile station 22 and a landline telephone user 32 via a public switched telephone network (PSTN) 34. The function of the base station 26 is commonly to handle the radio communications between the cell 24 and the wireless mobile terminal 22. In this capacity, the base station 26 functions chiefly as a relay station for data and voice signals.

As the wireless communication industry continues to advance, other technologies will most likely be integrated within these communication systems in order to provide value-added services. One such technology being considered is a global positioning system (GPS). Briefly, as illustrated in FIG. 2, GPS is a space-based triangulation system using satellites 52 and computers 58 to measure positions anywhere on the earth. GPS was first developed by the United States Department of Defense as a navigational system. The advantages of this navigational system over other land-based systems are that it is not limited in its coverage, it provides continuous 24-hour coverage, regardless of weather conditions, and is highly accurate. While the GPS technology that provides the greatest level of accuracy has been retained by the government for military use, a less accurate service has been made available for civilian use. In operation, a constellation of 24 satellites 52 orbiting the earth continually emit a GPS radio signal 54. A GPS receiver 56, e.g., a hand-held radio receiver with a GPS processor, receives the radio signals from the closest satellites and measures the time that the radio signal takes to travel from the GPS satellites to the GPS receiver antenna. By multiplying the travel time by the speed of light, the GPS receiver can calculate a range for each satellite in view. Ephemeris information provided in the satellite radio signal typically describes the satellite's orbit and velocity, thereby generally enabling the GPS processor to calculate the position of the GPS receiver 56 through a process of triangulation.

The startup of a GPS receiver typically requires the acquisition of a set of navigational parameters from the navigational data signals of four or more GPS satellites. This process of initializing a GPS receiver may often take several minutes.

The duration of the GPS positioning process is directly dependent upon how much information a GPS receiver has initially. Most GPS receivers are programmed with almanac data, which coarsely describes the expected satellite positions for up to one year ahead. However, if the GPS receiver does not have some knowledge of its own approximate location, then the GPS receiver cannot find or acquire signals from the visible satellites quickly enough, and, therefore, cannot calculate its position quickly. Furthermore, it should be noted that a higher signal strength is needed for capturing the C/A Code and the navigation data at start-up than is needed for continued monitoring of an already-acquired signal. It should also be noted that the process of monitoring the GPS signal is significantly affected by environmental factors. Thus, a GPS signal which may be easily acquired in the open typically becomes harder to acquire when a receiver is under foliage, in a vehicle, or worst of all, in a building.

Recent governmental mandates, e.g., the response time requirements of the FCC Phase II E-9 11 service, make it imperative that the position of a mobile handset be determined accurately and in an expedited manner. Thus, in order to implement a GPS receiver effectively within a mobile terminal while also meeting the demands for fast and accurate positioning, it has become desirable to be able to quickly provide mobile stations with accurate assistance data, e.g., local time and position estimates, satellite ephemeris and clock information, and visible satellite list (which generally varies with the location of the mobile station). The use of such assistance data can permit a GPS receiver that is integrated with or connected to a mobile station to expedite the completion of its start-up procedures. It is, therefore, desirable to be able to send the necessary GPS assistance information over an existing wireless network to a GPS receiver that is integrated with or connected to a mobile station.

Taylor et al., U.S. Pat. No. 4,445,118, discusses the concept of aiding or assisting GPS receivers. The method described uses a single transmitter, such as a geosynchronous satellite, to provide a single assistance message for a wide geographical area. The assistance data includes a list of GPS satellites in view, the respective satellite positions, and predicted Doppler shifts on the satellite signals. This structure of this message permits the position computation function (PCF) to be done in the user receiver.

Krasner, U.S. Pat. No. 5,663,734, describes another GPS receiver approach. The patent is mainly related to the receiver architecture, but discusses how the receiver performance can be improved by assistance. The patent mentions "data representative of ephemeris" and expected Doppler shifts as possible contents of the assistance message.

Lau, U.S. Pat. No. 5,418,538, describes a system and method for aiding a remote GPS/GLONASS receiver by broadcasting "differential" information from a like receiver in a "reference station". The reference station broadcasts a visible satellite list and also the associated ephemeris, in one embodiment. The advantage to the remote receiver is threefold: reduced memory requirements, lower-cost frequency reference, and faster acquisition. The discussion describes the benefit of being able to estimate and remove the Doppler due to the receiver clock inaccuracy after acquiring the first satellite.

Eshenbach, U.S. Pat. No. 5,663,735, describes a method whereby a GPS receiver derives an accurate absolute time reference from a radio signal. Optionally, the receiver also derives from the radio signal a frequency reference that is more accurate than the inexpensive crystal oscillator contained in the receiver. The GPS receiver performs the position calculation, and therefore must have the absolute time as well as the ephemeris and clock corrections for the GPS satellites.

Another assisted-GPS proposal for GSM-based networks is T1 standards documents T1P1/98-132r2. This proposal is based on placing reference GPS receivers at various nodes in the network, capturing the ephemeris information from these receivers, then providing this information along with a list of visible satellites to all handset-based GPS receivers via messages on GSM downlink bearers. The benefit of this approach is that it allows the handset-based GPS receiver to be fully functional, i.e., it contains the PCF and also can operate in continuous navigation mode.

One particularly challenging but important component for which assistance would be beneficial is obtaining accurate GPS timing information at the GPS receiver. Traditionally, GPS receivers demodulate the required timing information from the messages broadcast by the GPS satellites. However, reasonably error—free demodulation of such signals may not be possible below a certain signal threshold which itself may be significantly higher than the minimum signal level required for tracking already acquired signals and making range measurements. Accordingly, where GPS receiver operation is desirable under conditions of low-signal operation (for example, due to environmental attenuation, antenna compromises or other affects) it may not be possible to rely on demodulation of the transmitted information from the GPS satellites as a source of GPS timing information.

As noted above, one alternative approach previously proposed is the use of assistance information from a cellular network which may be provided to the combined GPS and cellular receiver by the serving cellular network in some manner. Three different approaches for providing such GPS timing information through network assistance have previously been proposed. First, some networks are synchronized by GPS. An example is the IS-95 CDMA system which, as a result, has an implicit timing relationship between the air-interface timing (i.e. the spreading codes) of the communication network and GPS timing. Therefore, once a GPS-equipped mobile station (GPS-MS) synchronizes with the communication network air-interface it is expected to also have accurate GPS timing that can be used to improve the sensitivity and time-to-first-fix (TTFF) of the GPS receiver in the device. This approach is only useful, however, for communication networks, such as IS-95 CDMA, which have such an implicit timing relationship.

One approach proposed for networks that are not so GPS-synchronized is to establish a relationship between GPS timing and a communication network's air-interface timing at each cell transmitter (base station) of the communication network by provision of an observer unit equipped with a GPS receiver as well as a cellular receiver. This timing relationship information can then be reported to a GPS assistance server of the communication network and thereby included in assistance messages sent to GPS-MS devices being serviced by the respective base station of the communication network. Accordingly, once a GPS-MS device synchronizes with the air-interface timing of its serving cell of the communication network and receives this timing assistance, it may determine the current GPS timing accurately. Systems incorporating this second approach are described in U.S. patent application Ser. No. 09/264,120 filed Mar. 8, 1999 and entitled *Method and System for Aiding GPS Receivers Via a Cellular or PCS Network* and in U.S. patent application Ser. No. 09/219,199 filed Dec. 22, 1998 and entitled *System and Method For Cold Start of a GPS Receiver in a Telecommunications Environment*, both of which are hereby incorporated by reference herein as if set forth in their entirety.

A third approach that may be applied to unsynchronized networks without a GPS observer unit (also referred to as a Location Measurement Unit (LMU)) at each base station location is described in U.S. Pat. No. 5,812,087 entitled *Method and Apparatus for Satellite Positioning System Based Time Measurement*. In this approach, the timing information is derived from samples of the navigation signal from multiple GPS satellites. For example, GPS-MS device may make measurements on the ranging codes of multiple GPS satellite signals and also sample some duration of the navigation data that is imposed on these codes. This data may then be returned to a server where the navigation data samples may be matched to the samples of a reference signal to estimate the time at which the other measurements were made.

Synchronization of timing through the network may not be feasible for a variety of reasons with these various approaches. For example, adding GPS receivers to each base station may be unduly costly and, in some regions of the world, there may even be political resistance to this approach given that the GPS system is operated by the United States Government. Furthermore, it may not be cost effective or feasible to retrofit existing communication networks with GPS synchronization capability. While the LMU approach may reduce the impact on existing communication networks to some degree, it is still subject to cost problems. The approach described in U.S. Pat. No. 5,812,087 may be burdened by the amount of data that must be returned to the server from the GPS-MS for each position computation. This may create excessive communication demands on a communication network for repetitive positioning types of applications such as navigation. Furthermore, this approach may not enable the GPS-MS to determine the time which is typically necessary to allow the positioning computation to occur locally at the GPS-MS as opposed to being performed at the server with the position computation result then being provided to the GPS-MS.

Therefore, it would be desirable to have lower cost ways to implement a wireless mobile terminal with a GPS receiver integrated therein while still obtaining benefits from the combined capabilities of the resulting device.

SUMMARY OF THE INVENTION

According to the present invention, methods, systems and mobile stations are provided which determine GPS timing by collecting energy from transmitted signals from one and preferably more acquired satellites to determine a single timing value, which may increase sensitivity. In addition, the mobile stations may use the entire navigation message from each satellite to obtain timing information which may further improve sensitivity and possibly remove latency from having to wait for the time-of-week (TOW) field to be received in the GPS satellite transmission. This is preferably accomplished by maximizing a single delay metric created based on expected (known in advance from some source) and actual (received) navigation bits from the acquired satellites. As a result, position fixes may possibly be obtained under disadvantaged conditions where the signal quality from the GPS satellites is poor. Furthermore, the timing information obtained pursuant to the present invention does not require a timing relationship between GPS and communication network time.

In one embodiment of the present invention, a method is provided for acquiring GPS timing information at a mobile station including a GPS receiver. Assistance information is first received from a communication network such as a wireless communication network. A plurality of GPS satellites are acquired using the received assistance information. Expected information, such as expected fields in navigation messages, associated with at least one of the plurality of acquired GPS satellites and preferably a plurality of GPS satellites is determined. Actual information received from the plurality of acquired GPS satellites is then correlated (compared) with the associated determined expected information for a plurality of delays to provide a quality indication for each of the plurality of delays. The GPS timing information is then determined based on the quality indications. In one embodiment of the present invention, the method further includes adjusting a timing of the GPS receiver based on the determined GPS timing information and determining a position of the GPS receiver based on the timing of the GPS receiver.

The assistance information may include ephemeris information which may be used to determine expected fields in the navigation messages. Approximate time-of-week information provided to the mobile station may also be used to determine expected time fields in the navigation message. Additional expected fields may be determined based on calculated parity bit information.

In another embodiment of the present invention, correlating operations include receiving the navigation messages from the at least two of the plurality of GPS satellites and demodulating the received navigation messages at the plurality of delays to provide delay received fields for each of the plurality of delays. The delay received fields are correlated with the expected fields to provide the quality indication for each of the plurality of delays. One of the plurality of delays is selected as the GPS timing information based on the quality indications. In a further embodiment, the assistance information includes an assistance time reference and the plurality of delays is determined based on an expected maximum delay time for receipt of the assistance time reference at the mobile station.

In a further embodiment of the present invention a buffer of expected current and upcoming symbols for each of the at least two of the plurality of GPS satellites is established from the corresponding expected fields. A correlation register for each of the at least two of the plurality of GPS satellites is initialized with an expected n most recent symbols for the respective GPS satellite. The expected n most recent symbols are obtained from the corresponding buffer of expected current and upcoming symbols for the respective GPS satellite. Coherent samples of the received navigation messages are correlated with the expected n most recent symbols for each of the at least two of the plurality of GPS satellites to provide a coherent correlation result for each of the plurality of delays. A next expected symbol is then shifted into each of the correlation registers and the initializing, correlating coherent samples and shifting operations are repeated for a first accumulation period while accumulating the coherent correlation results for each of the plurality of delays to provide the quality indication for each of the plurality of delays. In a further embodiment, the coherent correlation results are converted to power values associated with each of the plurality of delays. The accumulated coherent correlation results are then reset and initializing, correlating coherent samples and shifting for a first accumulation period, converting the coherent correlation results to power values and resetting the accumulated coherent correlation results operations are repeated for a second accumulation period while accumulating the power values associated with each of the plurality of delays to provide the quality indication for each of the plurality of delays.

In yet another aspect of the present invention, a plurality of GPS satellites are acquired by first receiving transmissions from the plurality of GPS satellites and synchronizing a timing of the GPS receiver with a boundary of a navigation message of a first acquired one of the plurality of GPS satellites based on the received transmissions to provide a first timing synchronization reference. An expected timing for others of the plurality of GPS satellites are adjusted based on the first timing synchronization reference. Others of the plurality of GPS satellites are then acquired based on their respective expected timing. In one embodiment, the assistance information includes an assistance time reference and ephemeris information and the timing of the GPS receiver is initialized based on the assistance time reference before synchronizing with a first satellite. GPS satellite acquisition parameters are determined based on the ephemeris information and the assistance time reference and the first acquired one of the plurality of GPS satellites is acquired based on the GPS satellite acquisition parameters.

In a further aspect of the present invention, a mobile station is provided including a first receiver that receives communication signals including assistance information from a wireless communication network and a GPS receiver that receives signals from GPS satellites, the GPS receiver including a local reference timer. A correlation circuit generates a quality indication for each of a plurality of delays based on the received signals from GPS satellites. A timing adjustment circuit adjusts the local reference timer responsive to the correlation circuit. In one embodiment, the correlation circuit includes a plurality of correlation bank circuits. Each of the correlation bank circuits includes a correlation shift register that receives expected symbol values and a plurality of accumulator circuits, each of the accumulator circuits being associated with one of the plurality of delays and outputting a delay quality indication. Each of the plurality of accumulator circuits receives as inputs the expected symbol values from the correlation shift register and the received signals from the GPS satellite. The mobile station further includes a combiner circuit coupled to each of the plurality of correlation bank circuits that outputs the quality indication for each of the plurality of delays based on the delay quality indications from the plurality of accumulator circuits of each of the plurality of correlation bank circuits.

In a further embodiment of the present invention, the mobile station includes a plurality of expected symbol buffer arrays, each of the expected symbol buffer arrays being associated with one of the plurality of correlation bank circuits to provide the expected symbol values to the corresponding correlation shift register. An expected symbol buffer initialization circuit may be provided that generates expected symbol values for storage in the expected symbol buffer arrays based on the assistance information. In one embodiment, the GPS receiver includes a position calculation circuit that determines a position of the mobile station based on the received signals and the local reference timer.

In one embodiment of the present invention, each of the accumulator circuits includes a coherent accumulation circuit having an I accumulation circuit and a Q accumulation circuit. The coherent accumulation circuit has a reset input. A power calculation circuit responsive to the coherent accumulation circuit calculates a power. A second accumulation circuit responsive to the power calculation circuit sums the calculated power. The second accumulation circuit also has a reset input. The in- phase (I) accumulation circuit and the quadrature (Q) accumulation circuit may include an adder and either a multiplier or an exclusive-OR (XOR). A reset circuit may be provided that resets the coherent accumulation circuit after a first accumulation period and resets the second accumulation circuit after a second accumulation period, the first accumulation period and the second accumulation period being measured based on symbol count. The combiner circuit may include a plurality of adders, each of the adders being associated with one of the plurality of delays.

As will further be appreciated by those of skill in the art, while described above primarily with reference to method aspects, the present invention may also be embodied as systems.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by those of skill in the art, the present invention may be embodied as methods or devices. Accordingly, the present invention may take the form of a hardware embodiment, a software embodiment or an embodiment combining software and hardware aspects.

Figure 1:
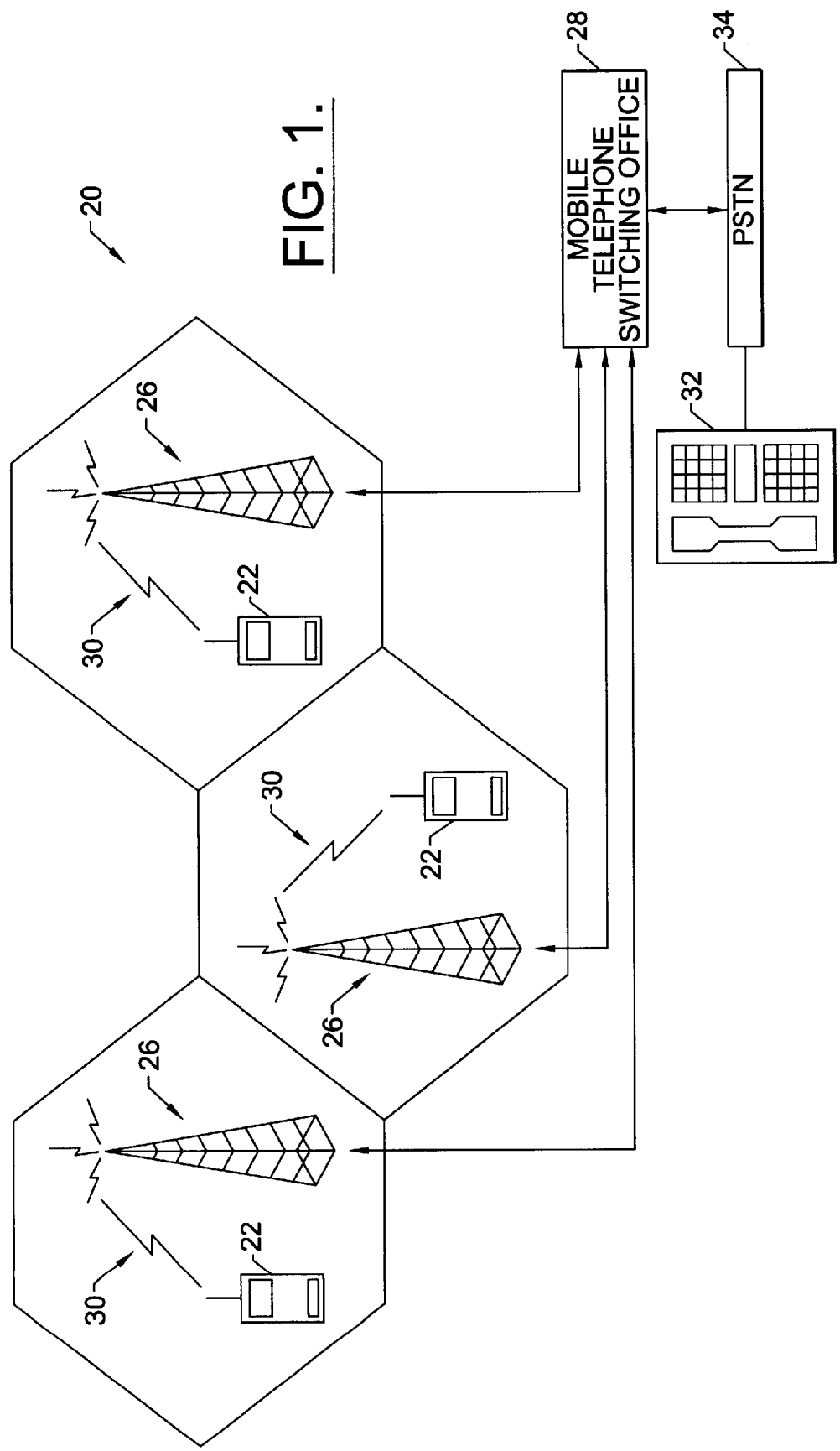
FIG. 1 is a schematic block diagram illustrating a conventional terrestrial wireless communication system.
Figure 2:
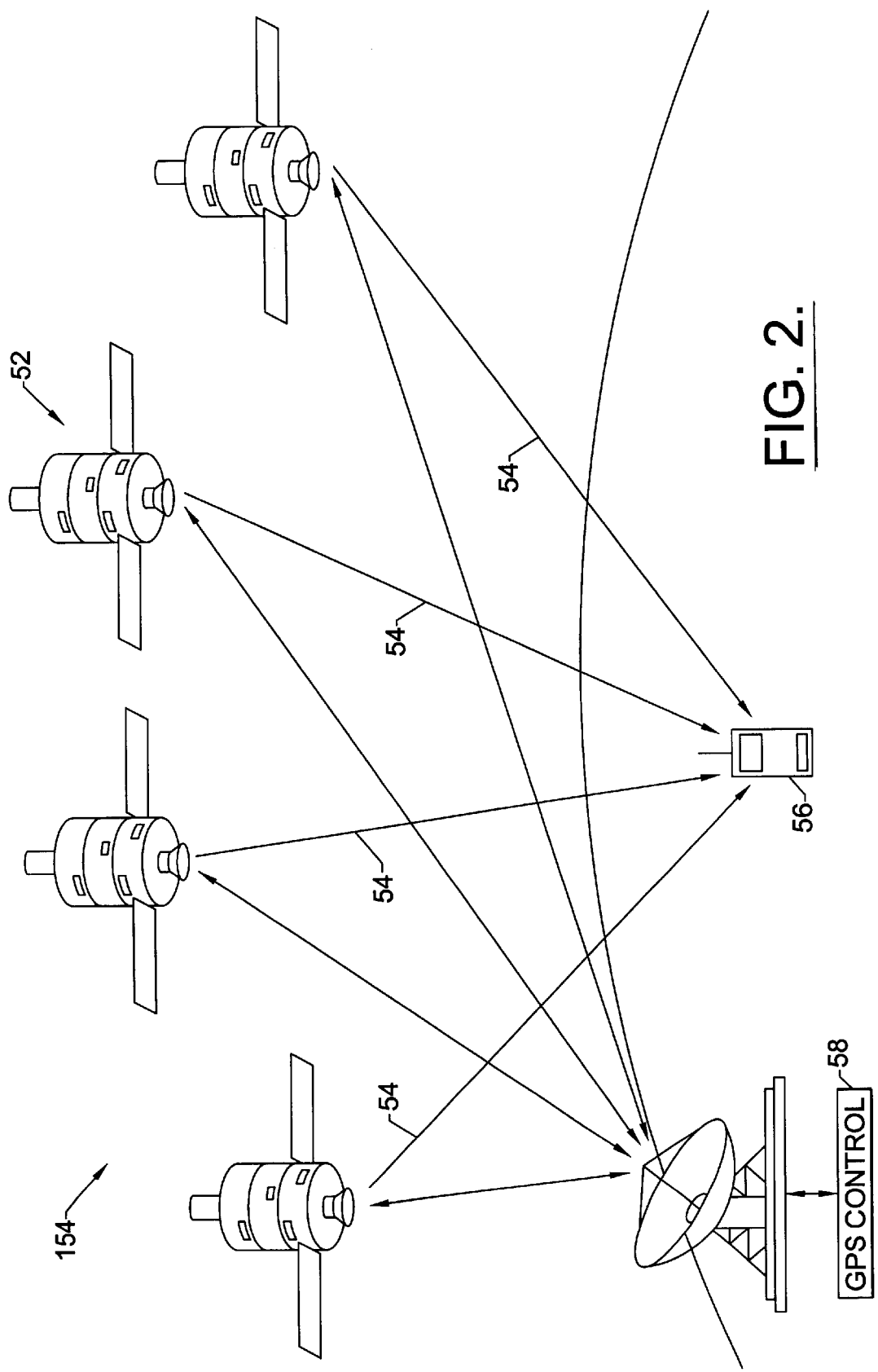
FIG. 2 is a schematic block diagram illustrating a GPS system.
Figure 3:
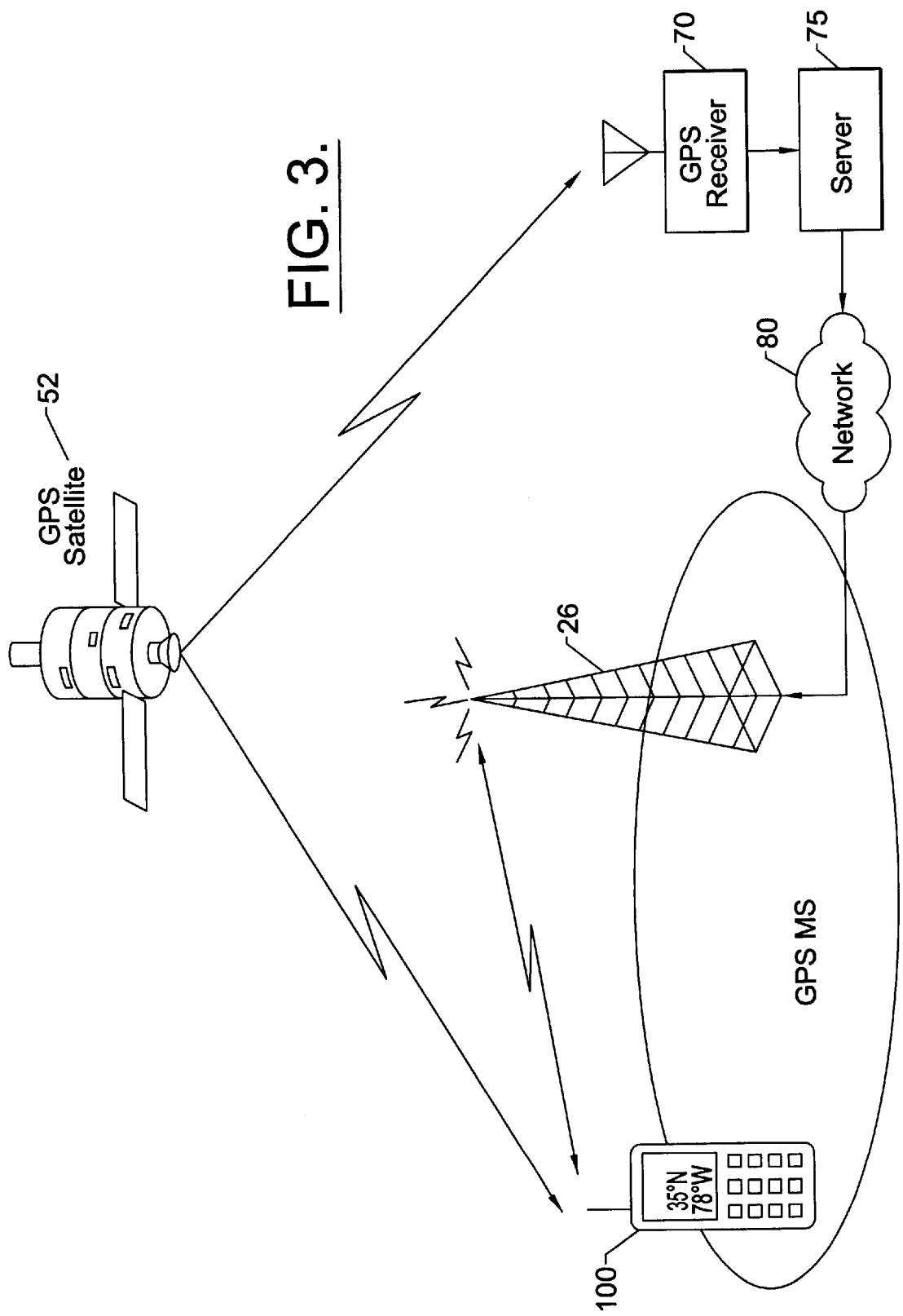
FIG. 3 is a schematic block diagram illustrating a mobile station according to an embodiment of the present invention operating in a cell of a wireless communication network.

Referring now to FIG. 3, an embodiment of a mobile station (or GPS-MS) 100 according to the present invention will now be described. The mobile station 100 receives signals from a GPS satellite(s) 52 and from a base station 26 of a wireless communication network. A GPS assistance server 75 coupled to a GPS receiver 70 is located remote from the base station 26 but accessible over the network 80.

The server 75 is a source of GPS assistance, which it can capture from a variety of sources including the local GPS receiver 70. The GPS receiver 70 also can provide GPS time information to the server 75, e.g., by sending a pulse to the server 75 followed by a message indicating the time at that pulse. The server 75 may then provide the GPS assistance in response to a request from a GPS-MS 100 in the area that it serves. This response maybe sent through the infrastructure of the cellular network, shown as a cloud 80 in FIG. 3, and then transmitted over the air-interface to the GPS-MS 100.

Figure 4:
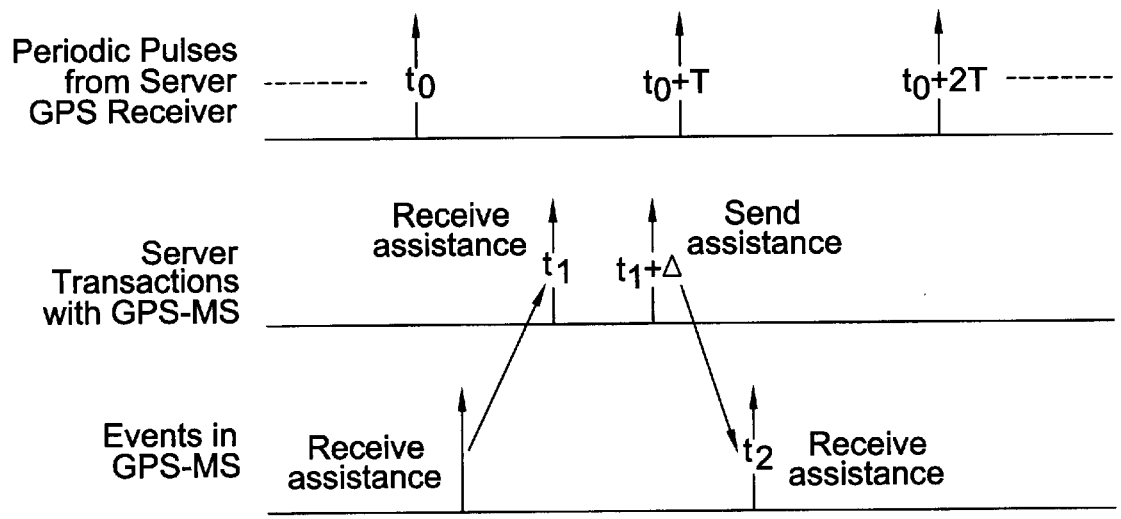
FIG. 4 is a timing diagram illustrating delay effects for timing information provided to a mobile station in the environment of FIG. 3.

Although the server 75 receives GPS timing from the GPS receiver 70, this information is generally inaccurate when it reaches the GPS-MS 100. This may be due to variety factors as illustrated in FIG. 4. FIG. 4 illustrates a situation where the server 75 receives periodic timing information from its local GPS receiver 70, e.g. at $t_0+NT$ where N is an integer and T is the period between successive updates. When a GPS-MS 100 requests assistance information, the server 75 receives the request at $t_1$ and sends the assistance at $t_1+\Delta$. This response includes the server's view of current GPS time. As real-time processing is not a normal capability of a server-type computer, FIG. 4 illustrates the server using the GPS time of the previous pulse until it receives another one. Thus, the server 75 includes the time $t_0$ in the assistance information sent to the GPS-MS 100, which, in turn, receives this assistance at $t_2$. The $t_2-t_0$ ambiguity is due to processing delay in the server 75 and transmission through the cellular network. The present invention generally addresses the resolution of this ambiguity.

Figure 5:
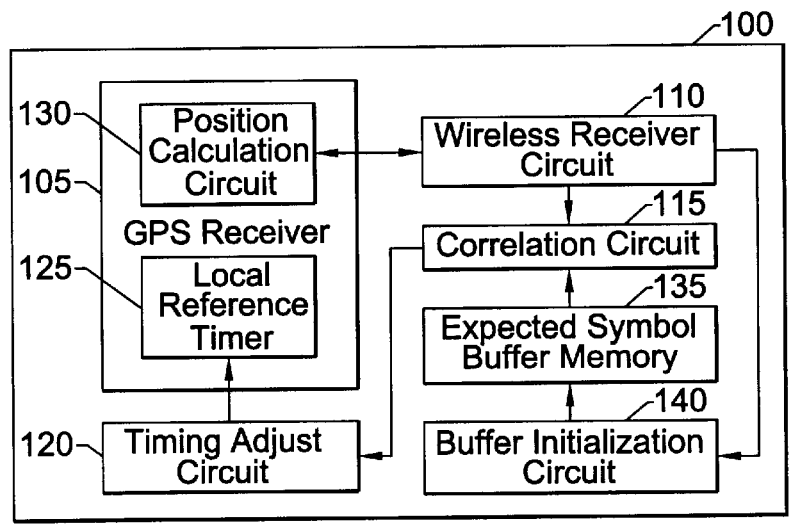
FIG. 5 is a schematic block diagram illustrating a mobile station including a GPS receiver according to an embodiment of the present invention.

The present invention will now be further described with reference to the block diagram illustration of an embodiment of the present invention in FIG. 5. With reference to FIG. 5, a wireless mobile station 100 in accordance with the present invention is illustrated. The station 100 includes a wireless receiver circuit 110 and a global positioning system (GPS) receiver 105. The wireless receiver circuit 10 may be particularly configured for operation as a wireless transceiver in essentially any type of wireless communication network. For instance, the wireless receiver circuit 110 may be configured for operating in a terrestrial or celestial wireless network, including cellular (digital or analog), satellite communication system, or personal communications systems (PCS). This includes digital systems configured for operation as local-area networks or wide-area networks. Therefore, the wireless receiver circuit 110 is merely illustrative of the types suitable for operation in accordance with the present invention, as would be evident to one of ordinary skill in the art upon reading the present disclosure.

The wireless receiver circuit 110 may include a processor for performing processing functions such as channel coding and interleaving, encryption, modulation/demodulation, and digital/analog conversion. The wireless receiver circuit 110 may further include a frequency synthesis mechanism which performs frequency synthesis functions for the generation of transmit carriers, receiver local oscillators, and other frequencies necessary for operation of the wireless receiver circuit 110. A radio frequency transmitter and a radio frequency receiver may also be included in wireless receiver circuit 110 for performing signal translation from a baseband frequency to a radio frequency carrier and from a radio frequency carrier to a baseband frequency, respectively. A duplexer may isolate the transmit and receive signals on a wireless antenna of the wireless receiver circuit 110. These components of the wireless receiver circuit 110 are merely illustrative of the components found in a wireless mobile terminal in a wireless communication network, and should not be considered limiting with respect to the scope of the present invention.

The GPS receiver 105 is configured to operate in conjunction with the global navigational system referred to as GPS, as well known to those skilled in the art. The GPS receiver 105 similarly includes various generally known components related to position calculation which will not be discussed herein except as they relate to the present invention. For purposes of brevity, it is generally noted that the GPS receiver 105 is interconnected to the wireless receiver circuit 110 in order to integrate the functionality of the GPS receiver with a mobile wireless terminal, and to enable sharing of components between the wireless mobile terminal and the GPS receiver, such as a keypad and a display.

As shown in FIG. 5, the GPS receiver 105 includes a position calculation circuit 130 and a local reference timer 125. The position calculation circuit 130 determines a position of the mobile station 100 based on the received signals from the GPS satellites 52 using triangulation techniques as generally known. These calculations utilize almanac and ephemeris information which may be available in the mobile station 100 or received by the mobile station 100 as assistance information through the wireless receiver circuit 110. These calculations further utilize the GPS reference time from the local reference timer 125.

The illustrated embodiment of the mobile station 100 in FIG. 5 further includes a correlation circuit 115 and a timing adjust circuit 120. The correlation circuit 115 generates a quality indication for each of a plurality of delays based on received signals from the GPS satellites 52 obtained by the GPS receiver 105. The timing adjustment circuit 120 adjusts the local reference timer 125 responsive to the quality indication information generated by the correlation circuit 115.

Also shown in the mobile station 100 of FIG. 5 is an expected symbol buffer memory 135 and a buffer initialization circuit 140. The expected symbol buffer memory 135 includes a plurality of expected symbol buffer arrays where each of the expected symbol buffer arrays is associated with one of a plurality of correlation bank circuits included in the correlation circuit 115 as will be further described with reference to FIG. 10. The expected symbol buffer arrays provide expected symbol values to correlation shift registers of the correlation bank circuits in the correlation circuit 115 for use in generating quality indications for the various delays. The buffer initialization circuit 140 generates expected symbol (which, in the case of existing GPS navigation messages, are binary bits transmitted at a 50 hertz rate or every 20 milliseconds) values for storage in the expected symbol buffer arrays of the expected symbol buffer memory 135 based on the assistance information received by the wireless receiver circuit 110 from the wireless communication network supporting the mobile station 100.

Figure 6:
FIG. 6 is a schematic block diagram illustrating a block of expected information according to an embodiment of the present invention.

An exemplary buffer of expected symbols is illustrated in FIG. 6, which shows the five subframes of a GPS navigation message and the state of the fields within each subframe. In particular, FIG. 6 shows a case where the GPS-MS 100 receives only the clock corrections and ephemeris in the assistance message. In this case, the GPS-MS 100 can generally compute the expected symbol (in this case bit) sequences of Subframes 1, 2, and 3, while only the Preamble in the Telemetry (TLM) word and the Time-of-Week (TOW) field in the Handover Word (HW) are generally known for the other subframes. Thus, the GPS-MS 100 can utilize 60% of the received signals as known, on average, under those conditions. However, if the GPS-MS 100 received all navigation fields (including almanac, satellite health status and complete TLM) as assistance, then all the bit sequences would generally be known.

Figure 8:
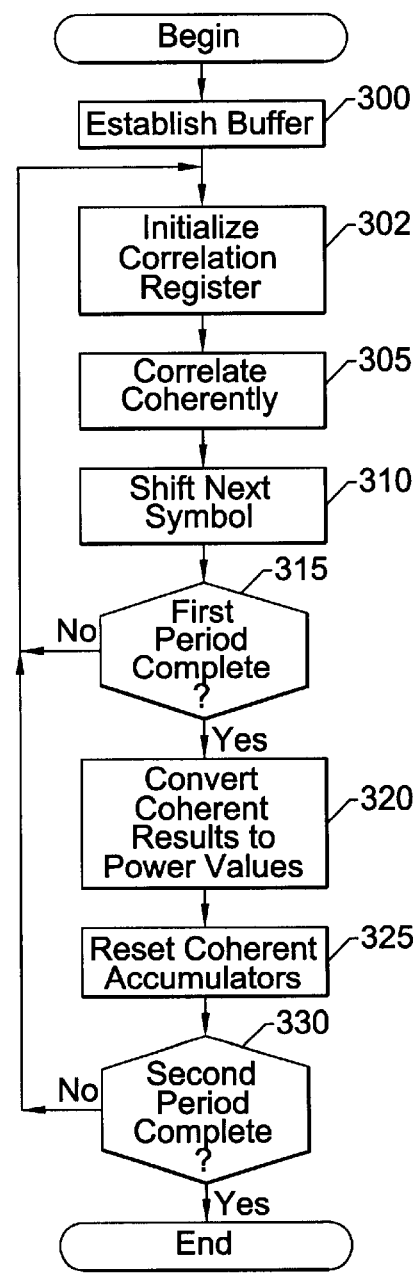
FIG. 8 is a flowchart further illustrating correlating operations according to an embodiment of the present invention.
Figure 9:
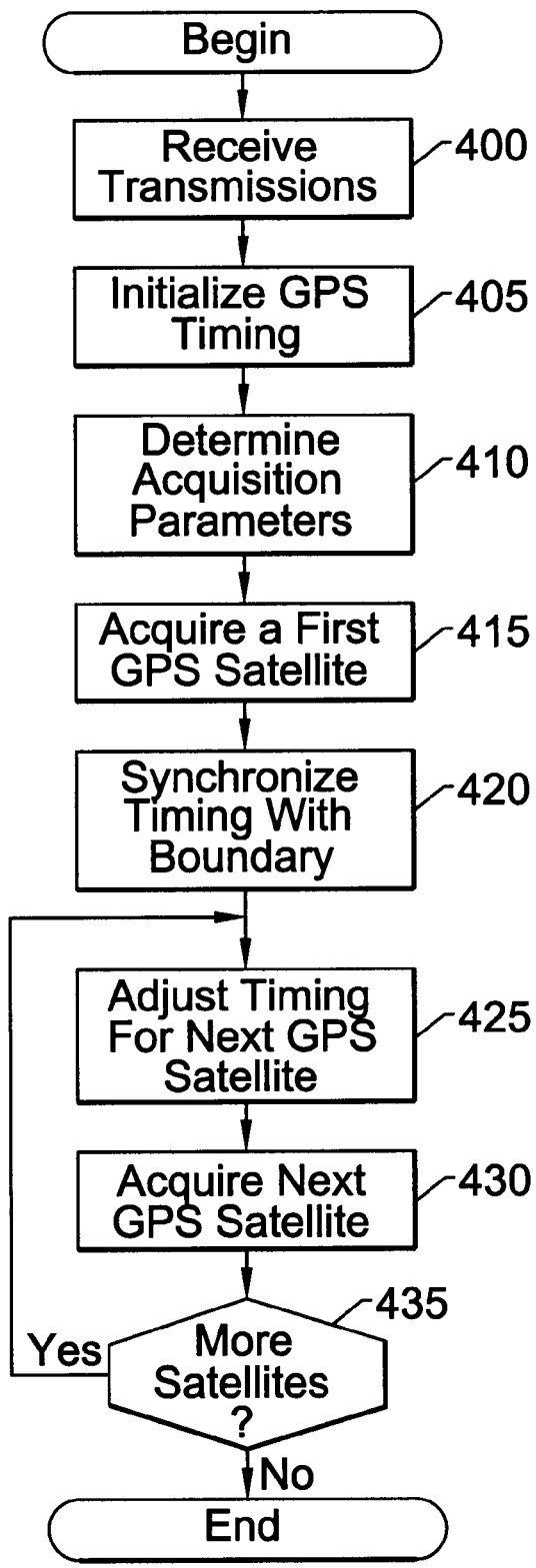
FIG. 9 is a flowchart further illustrating satellite acquisition operations according to an embodiment of the present invention.

Operations of the present invention will now be described with respect to the flowchart illustrations of FIGS. 7 through 9. It will be understood that each block of the flowchart illustrations and the block diagram illustrations of FIGS. 3, 5 and 10, and combinations of blocks in the flowchart illustrations and the block diagram illustrations, can be implemented by computer program instructions. These program instructions may be provided to a processor to produce a machine, such that the instructions which execute on the processor create means for implementing the functions specified in the flowchart and block diagram block or blocks. The computer program instructions may be executed by a processor to cause a series of operational steps to be performed by the processor to produce a computer implemented process such that the instructions which execute on the processor provide steps for implementing the functions specified in the flowchart and block diagram block or blocks.

Accordingly, blocks of the flowchart illustrations and the block diagrams support combinations of means for performing the specified functions, combinations of steps for performing the specified functions and program instruction means for performing the specified functions. It will also be understood that each block of the flowchart illustrations and block diagrams, and combinations of blocks in the flowchart illustrations and block diagrams, can be implemented by special purpose hardware-based systems which perform the specified functions or steps, or combinations of special purpose hardware and computer instructions. For example correlation circuit 115, buffer initialization circuit 140 and timing adjust circuit 120 may all be implemented as code executing on a processor, as custom chips or as a combination of the above.

Figure 7:
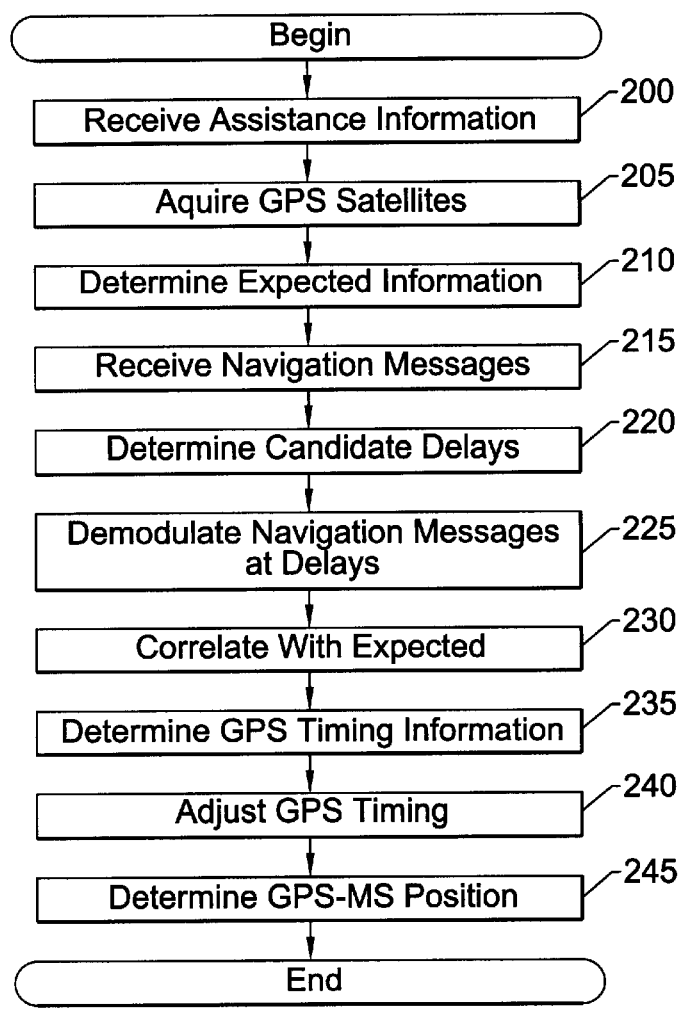
FIG. 7 is a flowchart illustrating operations for an embodiment of the present invention.

As shown in FIG. 7, operations begin at block 200 when the mobile station 100 receives assistance information from a communication network such as the wireless communication network illustrated in FIG. 3. Preferably, the server 75 sends the GPS-MS 100 assistance information including a list of visible satellites, their respective ephemeris and clock corrections, an approximate location (e.g., BTS coordinate), and the approximate time $t_0$. However, it is to be understood that the approximate time need not be provided in the assistance information to practice the present invention as an initial time may otherwise be provided to or maintained by the GPS-MS 100. The GPS-MS 100 receives the assistance message at a time $t_2$, and erroneously initializes its local clock to $t_0$ that was included in the assistance information. After initialization, the local clock keeps its own local estimate of GPS time. The mobile station 100 then acquires a plurality of GPS satellites 52 using the received assistance information (block 205).

Expected information associated with one or more, and, preferably, all of the plurality of acquired GPS satellites, is then determined at an initial time $t_3$ (block 210). At time $t_3$ the local clock of the GPS-MS 100 lags (less than) actual GPS time by an integer multiple of 20 ms due to the processing and transmission delays for the assistance. At time $t_3$, the GPS-MS 100 may determine the expected current and upcoming fields in the navigation messages of the acquired satellites (block 210) using some or all of the following data:

Navigation data received in the assistance information, such as ephemeris, clock corrections, and ionospheric corrections;

Known fields such as TOW and handover word (HOW) that appear at regular intervals in the navigation message; and Known algorithms for computing parity for the navigation data, where the parity bits are inserted in known locations in the transmitted bit sequence.

In this manner, the GPS-MS 100 forms a buffer of the expected current and upcoming symbols (typically bits) of each acquired satellite at current time $t_3$.

It is assumed for purposes of this description, that the GPS-MS 100 has an expected quality-of-service (QoS) from the network such that the delay $t_2-t_0$ is less than some maximum value, which is equivalent to n 20-ms (millisecond) navigation bits. For instance, the delay QoS could be specified in the standard for the network or it could be provided as a part of the assistance from the network. Given n, the GPS-MS correlates the current sample of the navigation data bit for each acquired satellite with the expected current and previous n bits for that satellite, and accumulates these correlation results into a single metric for each of the n+1 delays as will be described.

Actual navigation messages are received from the plurality of acquired GPS satellites (block 215). A plurality of delays, preferably based on an expected maximum delay for receipt of a time reference included in the assistance information from the communications network, is determined (block 220). Alternative ranges of delays may be selected on other basis where the time reference is provided from other sources or is maintained by the GPS-MS 100 so as to encompass the expected time inaccuracy. Preferably, the delays are spaced by 20-ms and a sufficient number of delays are tested to cover the maximum expected error in the local clock as set using the initial assistance information.

The received GPS signals, which are preferably navigation messages, from the plurality of satellites 52 are demodulated at each of the plurality of delays to provide delay received fields (i. e. received symbols or bits associated with a particular delay hypothesis for timing error) for each of the plurality of delays (block 225). The delay received fields are then correlated with the expected fields to provide the quality indication for each of the plurality of delays (block 230). As used herein, the terms correlate or correlating refer generally to comparing the expected and received fields by any means generally known to those of skill in the art and is not limited to the 30 correlation techniques described herein. GPS timing information is then determined by selecting one of the plurality of delays as the GPS timing information based on the quality indications from the correlation (block 235). A timing of the GPS receiver may then be adjusted based on the determined GPS timing information (block 240). A position of the GPS receiver is then determined based on the timing of the GPS receiver (block 245).

More particularly the GPS-MS 100 adjusts it internal clock 125 to correct for the chosen delay. The GPS-MS 100 then measures the code phases of the acquired GPS signals at some local time $t_4$ (which is now presumed aligned with GPS time) and computes the positions of the measured satellites at $t_4$ using the ephemeris supplied in the assistance. Based on these satellite positions, an estimate of the GPS-MS's own position supplied in the assistance, and the code-phase measurements, the GPS-MS 100 computes an estimate of its own position. Note that the determination of time may be very important to this process, as time bias in multiples of 20 ms can add significant error to the position computation due to incorrect calculations of the satellite positions.

In this manner, the present invention may enable determination of time from the received composite GPS signal by combining energy from multiple satellite signals. This may be beneficial in cases where accurate time is not provided by the communication network and may be particularly useful in environments with poor GPS signals. This is accomplished in one embodiment by the GPS-MS 100 creating buffers of expected bits from data received in the assistance message (i.e., ephemeris and clock corrections), well-known bit patterns not sent in the assistance, and known algorithms for generating the parity bits in the satellite navigation message. The GPS-MS 100 correlates the samples of the received navigation signals from multiple satellites with their respective buffers, and combines these correlation results into a single metric that is maximized over a range of possible delays.

Correlating operations for block 230 will now be further described with reference to the embodiment of the present invention illustrated in FIG. 8. Operations to correlate the delay received fields begin at block 300 with the establishment of a buffer of expected current and upcoming bits for each of the plurality of GPS satellites which is established from the corresponding expected fields associated with the navigation messages to be received. A correlation register for each of the acquired GPS satellites is initialized with an expected and most recent bits or the respective GPS satellite (block 302). The expected and most recent bits used or initializing the correlation registers at block 302 are obtained from the corresponding buffer of expected current and upcoming bits for the respective GPS satellites.

Coherent samples of the receive navigation messages are then correlated with the expected and most recent bits for each of the plurality of GPS satellites to provide a coherent correlation result for each of the plurality of delays (block 305). A next expected bit is then shifted into each of the correlation registers (block 310). Operations at blocks 302, 303, 310 are repeated for a first accumulation period while accumulating the coherent correlation results for each of the plurality of candidate delays to provide the quality indication for each of the plurality of delays (block 315). The coherent correlation results are then converted to power values associated with each of the plurality of delays (block 320). The accumulated coherent correlation results are then reset (block 325). Finally, operations at blocks 302 through 325 are repeated for a second accumulation period while accumulating the power values associated with each of the plurality of delays to provide the quality indication for each of the plurality of candidate delays (block 330).

Operations related to acquiring GPS satellites from block 205 of FIG. 7 will now be further described with reference to the embodiment of the present invention illustrated in FIG. 9. Operations begin at block 400 with receipt of a composite transmission from GPS satellites visible to the mobile station. The timing in the GPS receiver is initialized based on assistance time reference information provided by the communications network (block 405). GPS satellite acquisition parameters are also determined based on ephermeris information obtained in the assistance information from the communication network, such as phase and doppler frequencies, as well as the assistance time reference (block 410). The GPS-MS uses these acquisition parameters to search for the indicated signals in the composite signal it receives in the GPS frequency band. A first one of the visible GPS satellites is then acquired based on the GPS satellite acquisition parameters (block 415).

Once the GPS-MS 100 acquires the spreading code of the first satellite, the timing of the GPS receiver is synchronized with a boundary of the 20-ms (50 Hz) bits in the navigation message of the first acquired one of the GPS satellites based on the received transmissions from that satellite to provide a first timing synchronization reference (block 420). The expected timing for a next one of the GPS satellites is then adjusted based on the first timing synchronization reference and a known relationship between the respective GPS satellites (block 425). Equivalently, the GPS-MS 100 adjusts its local clock 125 by the timing offset (in the range +10 ms) determined during the bit synchronization. The other GPS satellite for which the timing adjustment from block 425 was implemented is then acquired based on the respective expected timing (block 430). Operations repeat at blocks 425 and 430 for the remainder of the plurality of GPS satellites being utilized by the mobile station (block 435). The GPS-MS 100 preferably searches for other satellites until it has acquired a number that it deems to be sufficient for a position computation (at least three, but perhaps more).

For the embodiment of the present invention described above with reference to FIG. 9, bit-edge synchronization is performed after one satellite is acquired. In another embodiment, as will now be described multiple satellites, are preferably acquired (block 415) before timing offset is resolved (block 420). In other words, as will be described, operations corresponding to blocks 425 through 435 are performed without first synchronizing timing with a boundary and then block 420 operations are executed. For this embodiment, once the GPS-MS 100 acquires the spreading code of the first satellite, this information is then used to affect the acquisition of the subsequent satellites. The expected timing for a next one of the GPS satellites is adjusted based on the difference between the expected and acquired code phase for the first satellite, or equivalently the GPS-MS 100 adjusts its local clock 125 by the code phase offset (in the range ±0.5 ms) in the first satellite signal. The other GPS satellite (for which the timing adjustment from block 425 was implemented) is then acquired based on the respective timing (block 430). Operations repeat at blocks 425 and 430 for the remainder of the plurality of GPS satellites being utilized by the mobile station (block 435). The GPS-MS 100 preferably searches for other satellites until it has acquired a number that it deems to be sufficient for a position computation (preferably at least three, but perhaps more). Having acquired the satellites, the GPS-MS 100 may remove the spreading codes from the plurality of acquired signals by generating replica codes at the plurality of acquired code phases and correlating these with the received composite signal. In this manner, the GPS-MS 100 can sample the navigation messages transmitted by the plurality of acquired satellites. After acquiring the plurality of GPS satellites, the mobile station may only have knowledge of the relative code phases of the respective satellites. Equivalently, the mobile station may be understood as having ambiguous knowledge of the range to the respective satellites because it has acquired only the phase of the codes within heir respective 1-ms periods. The remaining ambiguity is typically due to the propagation time between the satellites and the mobile station, which may be on the order of 70 ms, and the offset or bias (t2–t0)(see, e.g., FIG. 4) in the local clock. As described above, the fact that the mobile station has knowledge of time to within a few seconds and knowledge of position at least to the accuracy of the nearest cell site or BTS may be beneficially utilized according to the present invention. From this information, the mobile station may determine the expected propagation times from the respective satellites relatively accurately, such that the residual ambiguity is expected to be due to the local clock offset t2–t0.

As the offset t2–t0 is generally arbitrary due to the non-deterministic processing and transmission delays, it may consist of both a fractional and an integer number of 20-ms navigation-bit periods. These two portions of the offset can be resolved either sequentially or simultaneously. In this alternative embodiment in which a plurality of satellites are used before timing offset is resolved, the fractional portion may be resolved initially by estimating the edge or transition between successive 20-ms navigation message bits.

Figure 11:
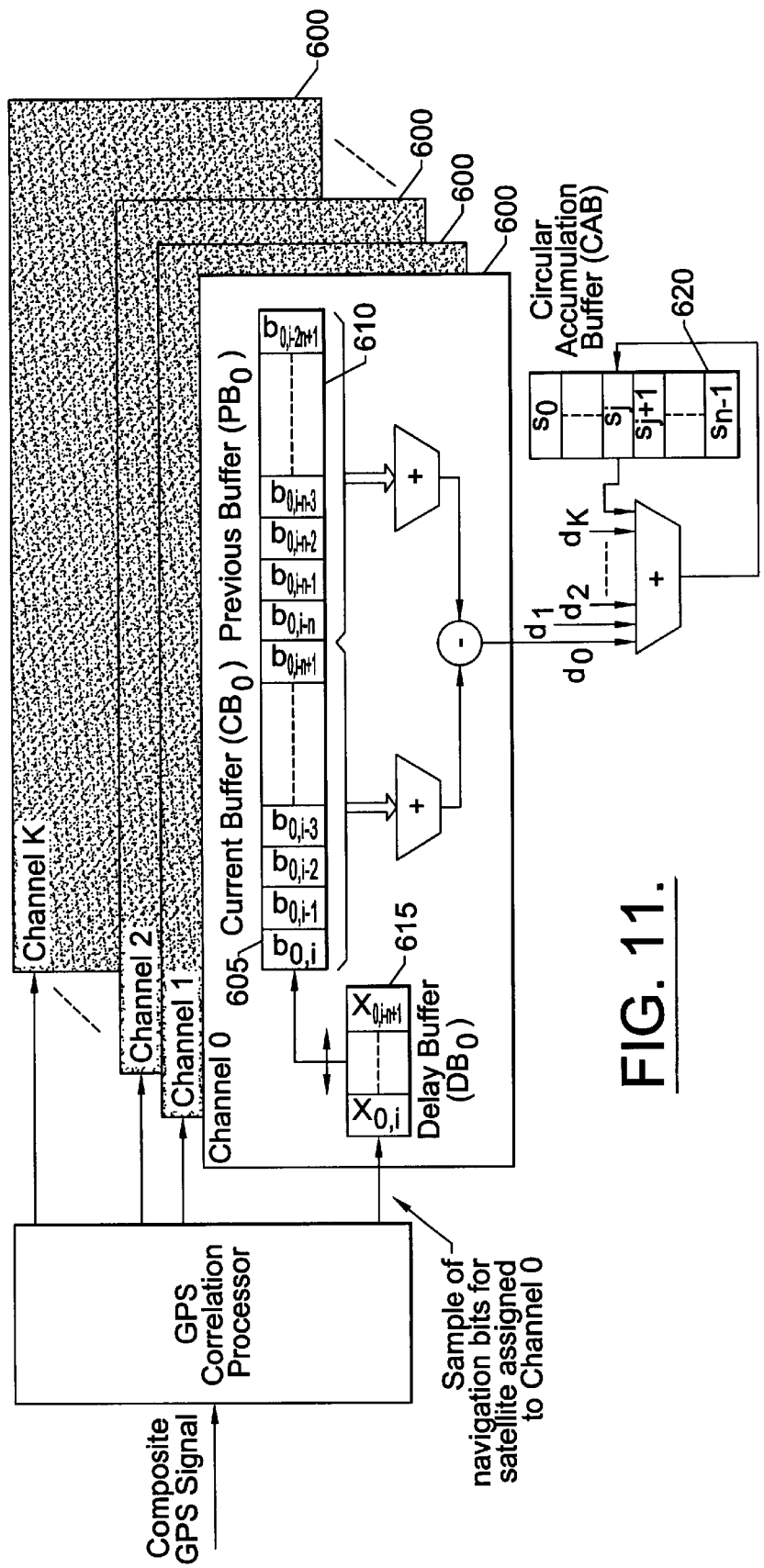
FIG. 11 is a schematic block diagram illustrating an accumulation circuit according to an embodiment of the present invention.

One example of a circuit which may be utilized to perform these operations is illustrated in FIG. 11. The illustrated circuit includes a plurality of accumulation-and-difference channels 600, each of which contains buffers for current (CB) 605 and previous (PB) 610 20-ms navigation bits. Each of the channels may be assigned to one of the plurality of acquired satellites. In the illustrated embodiment of FIG. 11, a variable-length delay buffer (DB) 615 precedes each of the accumulation-and-difference blocks. The outputs of the respective channels may be summed together with the contents of an element of a circular accumulation buffer (CAB) 620 and the result may be returned to the same CAB element. The length of the various buffers may depend on the resolution at which the 20 -ms navigation message bits are sampled. For instance, if samples are taken at each 1-ms code period, then the length of the respective CBs, PBs, and CAB for the illustrated embodiment will be n=20 and the maximum length of the DBs will also be n=20.

With the circuit of FIG. 11, the mobile station determines the expected propagation times of the acquired satellites and sets the lengths of the respective DBs to compensate for the differences, modulo 20 ms. As an example, consider the case where the navigation message is sampled at 1-ms intervals and the four acquired satellites have propagation times of 72 ms, 66 ms, 75 ms, and 80 ms, respectively. As the fourth satellite has the longest propagation time, its DB is set to zero length and the other lengths are set to 8, 14, and 5, respectively. Next, the samples of the satellite navigation bits are output from the correlation processor into the respective DBs, the outputs of which go into the CBs of the respective channels. As more samples are captured, the previous samples flow from left to right in the diagram of FIG. 11, filling first the CBs and then the PBs. After the PB for the channel with the longest delay buffer has been initially filled, the calculations commence. At each sample (e.g., 1 ms in the example), two sums for each channel may be formed from the contents of the CB and PB registers and the difference of these sums may be computed. The differences $d_0 \ldots d_K$ for all of the channels may then be summed together with one of the elements of the CAB, such as $s_j$ shown in FIG. 11, and stored back in the same location ($s_j$) in the CAB 620. At the next sample instance, new samples for all satellites are shifted into the respective channels, with the differences $d_0 \ldots d_k$ being summed with the next CAB element $s_{j+1}$. The CAB element pointer is thus incremented for each new sample until after $s_{n-1}$ when it is affected to point at $s_0$. This process may be repeated until the mobile station decides to terminate the computation, preferably after an integral number of 20-ms cycles through the CAB. The termination decision may be made based on the signal quality determined during acquisition of the satellites, with better signal quality resulting in a shorter operative duration. In this manner, a total of n metrics $s_0 \ldots s_{n-1}$ may be computed, one for each of the n possible values of the fractional-bit-period delay. If n=20 (i.e. 1-ms samples), then the delay associated with the maximum metric is preferably chosen as the fractional delay estimate. Where lower-resolution sampling is used (e.g., 2 ms), the delay may be chosen by interpolating between the maximum metric and metrics of one or more neighboring delays.

It is to be understood by those skilled in the art that the resolution of the fractional ambiguity can be done using a single satellite signal or multiple satellites as described above. However, it is further to be understood that the use of multiple satellites for the bit-edge synchronization may be preferable which may be achieved with accurate information provided in the assistance. Compared to the single-satellite case, the use of multiple satellites in this process may reduce the time required for a given signal level or may enable the ambiguity to be resolved for reduced signals in the same duration of time.

Once the mobile station has resolved the fractional ambiguity (i.e., found the bit edge), it is prepared to resolve the integer-bit-period ambiguity in the offset $t_2-t_0$. Expected navigation message information associated with one or more, and, preferably, all of the plurality of acquired GPS satellites, is then determined at an initial time t3 (block 210)(FIG. 7). At time t3, the local clock of the mobile station 100 is expected to lag (is less than) actual GPS time by an integer multiple of 20 ms due to the processing and transmission delays. At time t3, the mobile station 100 may determine the expected current and upcoming fields in the navigation messages of the acquired satellites (block 210) using some or all of the following data:

Navigation data received in the assistance information, such as ephemeris, satellite clock corrections, ionospheric delay corrections, corrections between UTC and GPS time, almanac, satellite health, and telemetry message (TLM);

Known navigation data fields such as TOW and preamble that appear at regular intervals in the navigation message; and Known algorithms for computing parity for the navigation data and known sequence of navigation data elements and parity.

Figure 10:
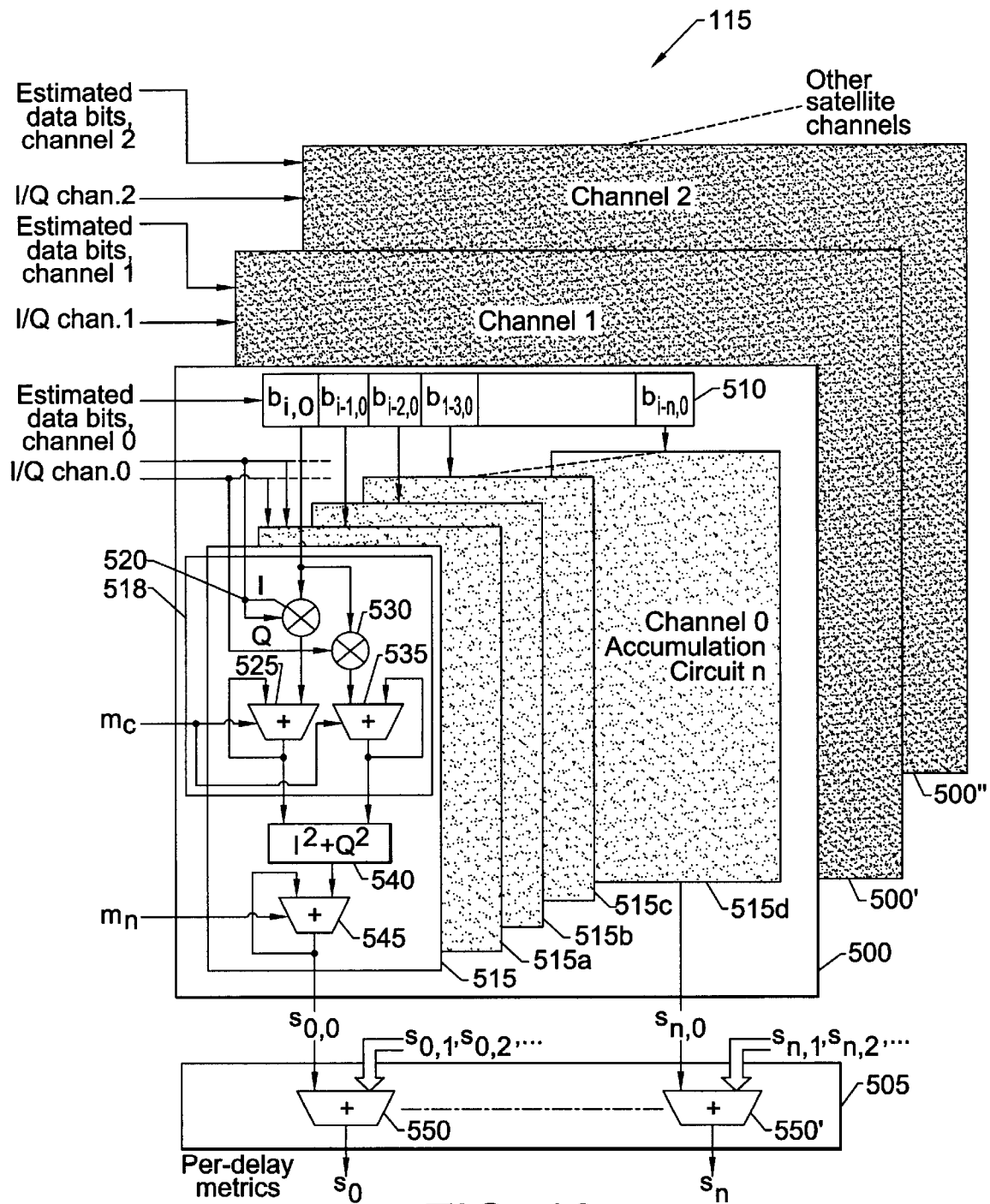
FIG. 10 is a schematic block diagram illustrating a correlation circuit according to an embodiment of the present invention.

Referring now to the schematic block diagram of FIG. 10, an embodiment of a correlation circuit 115 according to the present invention will now be further described. As shown in the embodiment of FIG. 10, the correlation circuit 115 includes a plurality of correlation bank circuits 500, 500', 500", Preferably, there is one correlation bank circuit (or channel) for each GPS satellite acquired by the mobile station 100. The correlation circuit 115 further includes a combiner circuit 505 coupled to each of the correlation bank circuits 500, 500', 500" that outputs the quality indication for each of the plurality of delays based on the delay quality indications from the correlation bank circuits 500, 500', 500".

The correlation bank circuits 500, 500', 500" include a correlation shift register 510 that receives expected (or estimated) symbols (which, in the case of existing GPS signals, are binary bits) for its associated GPS satellite. The correlation bank circuits 500, 500', 500" further include a plurality of accumulator circuits 515, 515A, 515B, 515C, 515D. Each of the accumulator circuits 515, 515A, 515B, 515C, 515D is associated with one of the plurality of delays and outputs a delay quality indication. Each of the accumulator circuits 515, 515A, 515B, 515C, 515D receives as inputs the expected (estimated) bit values from the correlation shift register 510 and received signals from the GPS satellite associated with the particular correlation bank circuit 500, 500', 500".

Each accumulator circuit 515, 515A, 515B, 515C, 515D includes a first, coherent accumulation circuit 518. The coherent accumulation circuit 518 includes a multiplier 520 and an adder 525 defining an I accumulation circuit and a multiplier 530 and an adder 535 defining a Q accumulation circuit. The coherent accumulation circuit 518 further includes a reset input $m_c$ which resets the adders 525, 535. The accumulator circuit 515, 515A, 515B, 515C, 515D further includes a power calculation circuit 540 which is responsive to the coherent accumulation circuit 518 to calculate a power. A second accumulation circuit 545 is responsive to the power calculation circuit and sums the calculated power as will be described further herein and was previously described with reference to FIG. 8. The second accumulation circuit 545 has a reset input $m_n$ that resets the accumulator. A reset circuit generates the reset inputs $m_c$ and $m_n$. Finally, the combiner circuit 505 includes a plurality of adders 550, 550' each of the adders being associated with one of the plurality of delays.

With reference to FIG. 10, at an initial time $t_3$ after receipt of assistance information, the GPS-MS 100 initializes the register 510 with the expected current and past n bits for satellite 0, $\{b_{i,0} \ldots b_{i-n,0}\}$. Likewise, the GPS-MS 100 initializes the registers for the other acquired satellites (channels 1,2, ... in FIG. 10) with the expected current and past n bits in the respective navigation messages. In addition, the GPS-MS 100 initializes the n+1 accumulator circuits 515 for each satellite channel. Note that these accumulator circuits 515 can be implemented with dedicated hardware registers or other hardware devices, or alternatively, as a software algorithm with storage in memory(such as random access memory (RAM)) of a microprocessor that is executing the accumulation operations or a combination of the above.

After initializing the registers 510 at $t_3$, the GPS-MS 100 coherently samples the navigation message for each of the GPS satellites and correlates the in-phase (I) and quadrature (Q) components of the sample with all bits in the registers of the 30 respective satellites. Although multipliers 520, 530 are shown in the embodiment of FIG. 10, an exclusive-OR (XOR) operation may, alternatively, be utilized due to the fact that the expected symbols are binary (1/0 or +/−1) bit values. These initial vectors of coherent correlation results for the channels are stored temporarily, to be accumulated with future correlation results.

Subsequently, the next expected bit for each navigation message is shifted into the respective bit registers 510, with the other bits shifted toward the right in FIG. 10 and the oldest bit ($b_{i-n_2*}$) being discarded. These new bit vectors are correlated against the new samples for the navigation bit for the respective GPS satellites, and the vectors of coherent correlation results are accumulated with the past result. This process is preferably repeated for subsequent 20-ms GPS bit periods until a predetermined number have been accumulated.

Optionally, the GPS-MS 100 may set coherent and non-coherent accumulation periods. For instance, some number $m_c$ of coherent correlation vectors can be accumulated for each channel (satellite), with the final results being converted to power vectors by power calculation circuit 540 and the associated coherent sums being reset prior to accumulating the next $m_c$ values. As shown in FIG. 10, some number $m_n$ of these power vectors also are accumulated in adder 545. Thus, a total of $m_n$ $m_c$ bit periods is used in the metric calculation, with $m_c$ and $m_n$ determined by the GPS-MS 100.

The results of this process is a vector for each satellite of non-coherent sums for each delay, $S_{0,k} \ldots S_{n,k}$, where k is the number of the channel assigned to the particular satellite. These results are preferably summed together in the combiner circuit 505 to compute an overall metric for each delay, $$S_i = \sum_{k=0}^{M-1} S_{i,k}, 0 \le i \le n,$$

where M is the number of channel circuits that were assigned to acquired satellites. The GPS-MS 100 preferably chooses the delay T1 that has the maximum associated metric $S_i$.

In another embodiment of the present invention, both the fractional and integer portions of the mobile station's timing offset t2−t0 are determined simultaneously, for example, by using the circuit shown in FIG. 10. In this embodiment, the I/Q samples of the navigation message bits that are input to the correlation bank circuits occur at a greater resolution than the 20-ms bit period. The number of possible delays and accumulator circuits for each channel may be determined by the maximum possible delay and the resolution of the navigation message samples. For example, a maximum delay of five seconds with 1-ms sampling resolution results in 5000 possible delays, each of which may be associated with per-channel accumulator circuits and a delay metric. As the estimated navigation data bits are preferably computed at 20-ms resolution, each of the elements of buffer 510 is preferably input to multiple accumulator circuits, with the number depending on the resolution of the I/Q samples of the navigation message (e.g., 20 for 1-ms sampling). In order to compensate for the differences in propagation delay from the plurality of acquired satellites to the mobile station, the I/Q samples of the navigation message preferably pass through variable-length delay buffers, for example, such as those shown in FIG. 11 and described above. Those skilled in the art will recognize that, while a combined fractional/integer offset determination may provide some reduction in the amount of time to resolve the offset, the memory requirements may be increased substantially compared to sequential offset determination.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for acquiring GPS timing information at a mobile station including a GPS receiver comprising the steps executed at the mobile station of:
   receiving assistance information from a communication network;
   acquiring a plurality of GPS satellites using the received assistance information;
   determining expected fields in navigation messages [information] associated with at least one of the plurality of acquired GPS satellites based on the received assistance information;
   correlating actual information received from the at least one of the plurality of acquired GPS satellites with the associated determined expected fields in navigation messages for a plurality of delays to provide a quality indication for each of the plurality of delays; and
   determining the GPS timing information based on the quality indications.

2. A method according to claim 1 further comprising the steps of:
   adjusting a timing of the GPS receiver based on the determined GPS timing information; and
   determining a position of the GPS receiver based on the timing of the GPS receiver.

3. A method according to claim 1 wherein the step of determining expected fields in navigation messages further comprises the step of determining expected fields in navigation messages for at least two of the plurality of GPS satellites and wherein the step of receiving assistance information from a communication network comprises the step of receiving the assistance information from a wireless communication network.

4. A method according to claim 3 wherein assistance information includes ephemeris information and wherein the step of determining expected fields in navigation messages further comprises the step of determining expected fields in navigation messages associated with each of the at least two of the plurality of GPS satellites based on the received ephemeris information.

5. A method according to claim 4 wherein the step of determining expected fields in navigation messages further comprises the step of determining expected fields in navigation messages associated with each of the at least two of the plurality of GPS satellites based on time-of-week information known to the mobile station.

6. A method for acquiring GPS timing information at a mobile station including a GPS receiver comprising the steps of:
   receiving assistance information from a communication network;
   acquiring a plurality of GPS satellites using the received assistance information;
   determining expected information associated with at least one of the plurality of acquired GPS satellites;
   correlating actual information received from the at least one of the plurality of acquired GPS satellites with the associated determined expected information for a plurality of delays to provide a quality indication for each of the plurality of delays;

determining the GPS timing information based on the quality indications; and wherein the step of determining expected information associated with at least one of the plurality of acquired GPS satellites further comprises the step of determining expected fields in navigation messages associated with each of at least two of the plurality of GPS satellites based on calculated parity bit information.

7. A method for acquiring GPS timing information at a mobile station including a GPS receiver comprising the steps of:

receiving assistance information from a communication network:

acquiring a plurality of GPS satellites using the received assistance information;

determining expected fields in navigation messages associated with at least two of the plurality of acquired GPS satellites;

correlating actual information received from the at least two of the plurality of acquired GPS satellites with the associated determined expected fields in the navigation messages for a plurality of delays to provide a quality indication for each of the plurality of delays;

determining the GPS timing information based on the quality indications: and wherein the step of correlating actual information further comprises the steps of:

receiving the navigation messages from the at least two of the plurality of GPS satellites;

demodulating the received navigation messages at the plurality of delays to provide delay received fields for each of the plurality of delays;

correlating the delay received fields with the expected fields to provide the quality indication for each of the plurality of delays; and wherein the step of determining the GPS timing information comprises the step of selecting one of the plurality of delays as the GPS timing information based on the quality indications.

8. A method according to claim 7 wherein the assistance information includes an assistance time reference and wherein the step of demodulating is preceded by the step of determining the plurality of delays based on an expected maximum delay time for receipt of the assistance time reference at the mobile station.

9. A method according to claim 7 wherein the step of correlating the delay received fields includes the steps of:

establishing a buffer of expected current and upcoming symbols for each of the at least two of the plurality of GPS satellites from the corresponding expected fields;

initializing a correlation register for each of the at least two of the plurality of GPS satellites with an expected n most recent symbols for the respective GPS satellite, wherein the expected n most recent symbols are obtained from the corresponding buffer of expected current and upcoming symbols for the respective GPS satellite;

correlating coherent samples of the received navigation messages with the expected n most recent symbols for each of the at least two of the plurality of GPS satellites to provide a coherent correlation result for each of the plurality of delays;

shifting a next expected symbol into each of the correlation registers; and repeating the steps of initializing, correlating coherent samples and shifting for a first accumulation period while accumulating the coherent correlation results for each of the plurality of delays to provide the quality indication for each of the plurality of delays.

10. A method according to claim 9 wherein the repeating step is followed by the steps of:

converting the coherent correlation results to power values associated with each of the plurality of delays;

resetting the accumulated coherent correlation results; and repeating the steps of repeating the steps of initializing, correlating coherent samples and shifting for a first accumulation period, converting the coherent correlation results to power values and resetting the accumulated coherent correlation results for a second accumulation period while accumulating the power values associated with each of the plurality of delays to provide the quality indication for each of the plurality of delays.

11. A method according to claim 7 further comprising the steps of:

adjusting a timing reference of the GPS receiver based on the GPS timing information; and determining a position of the mobile station based on the timing reference of the GPS receiver.

12. A method according to claim 7 wherein the step of acquiring a plurality of GPS satellites further comprises the steps of:

receiving transmissions from the plurality of GPS satellites;

synchronizing a timing of the GPS receiver with a boundary of a navigation message of a first acquired one of the plurality of GPS satellites based on the received transmissions to provide a first timing synchronization reference;

adjusting an expected timing for others of the plurality of GPS satellites based on the first timing synchronization reference; and acquiring the others of the plurality of GPS satellites based on their respective expected timing.

13. A method according to claim 12 wherein the assistance information includes an assistance time reference and ephemeris information and wherein the step of synchronizing a timing of the GPS receiver is preceded by the steps of:

initializing the timing of the GPS receiver based on the assistance time reference;

determining GPS satellite acquisition parameters based on the ephemeris information and the assistance time reference; and acquiring the first acquired one of the plurality of GPS satellites based on the GPS satellite acquisition parameters.

14. A mobile station comprising:

a first receiver that receives communication signals including assistance information for GPS satellite acquisition from a wireless communication network;

a GPS receiver that receives signals associated with fields in navigation messages from GPS satellites, the GPS receiver including a local reference timer;

a correlation circuit that generates a quality indication for each of a plurality of delays based on the received signals associated with fields in the navigation messages from GPS satellites and expected symbol values for the fields in the navigation messages; and a timing adjustment circuit that adjusts the local reference timer responsive to the correlation circuit.

15. A mobile station comprising:

a first receiver that receives communication signals including assistance information for GPS satellite acquisition from a wireless communication network;

a GPS receiver that receives signals from GPS satellites, the GPS receiver including a local reference timer:

a correlation circuit that generates a quality indication for each of a plurality of delays based on the received signals from GPS satellites;

a timing adjustment circuit that adjusts the local reference timer responsive to the correlation circuit; and wherein the correlation circuit further comprises:

a plurality of correlation bank circuits, each of the correlation bank circuits comprising:

a correlation shift register that receives expected symbol values; and a plurality of accumulator circuits, each of the accumulator circuits being associated with one of the plurality of delays and outputting a delay quality indication, wherein each of the plurality of accumulator circuits receives as inputs the expected symbol values from the correlation shift register and the received signals from the GPS satellite; and a combiner circuit coupled to each of the plurality of correlation bank circuits that outputs the quality indication for each of the plurality of delays based on the delay quality indications from the plurality of accumulator circuits of each of the plurality of correlation bank circuits.

16. The mobile station of claim 15 further comprising a plurality of expected symbol buffer arrays, each of the expected symbol buffer arrays being associated with one of the plurality of correlation bank circuits to provide the expected symbol values to the corresponding correlation shift register.

17. The mobile station of claim 16 further comprising a expected symbol buffer initialization circuit that generates expected symbol values for storage in the expected symbol buffer arrays based on the assistance information.

18. The mobile station of claim 17 wherein the GPS receiver further comprises a position calculation circuit that determines a position of the mobile station based on the received signals and the local reference timer.

19. The mobile station of claim 15 wherein each of the accumulator circuits further comprises:

a coherent accumulation circuit having an I accumulation circuit and a Q accumulation circuit, the coherent accumulation circuit having a reset input;

a power calculation circuit responsive to the coherent accumulation circuit that calculates a power; and a second accumulation circuit responsive to the power calculation circuit that sums the calculated power, the second accumulation circuit having a reset input.

20. The mobile station of claim 19 wherein at least one of the I accumulation circuit and the Q accumulation circuit further comprise an adder and at least one of a multiplier and an exclusive-OR (XOR).

21. The mobile station of claim 19 further comprising a reset circuit that resets the coherent accumulation circuit after a first accumulation period and resets the second accumulation circuit after a second accumulation period, the first accumulation period and the second accumulation period being measured based on symbol count.

22. The mobile station of claim 21 wherein the combiner circuit further comprises a plurality of adders, each of the adders being associated with one of the plurality of delays.

23. A system for acquiring GPS timing information at a mobile station including a GPS receiver comprising the following positioned in the mobile station:

means for receiving assistance information from a communication network;

means for acquiring a plurality of GPS satellites using the received assistance information;

means for determining expected fields in navigation messages associated with at least one of the plurality of acquired GPS satellites based on the received assistance information;

means for correlating actual information received from the at least one of the plurality of acquired GPS satellites with the associated determined expected fields in navigation messages for a plurality of delays to provide a quality indication for each of the plurality of delays; and means for determining the GPS timing information based on the quality indications.

24. A system according to claim 23 further comprising:

means for adjusting a timing of the GPS receiver based on the determined GPS timing information; and means for determining a position of the GPS receiver based on the timing of the GPS receiver.

25. A system according to claim 23 wherein the means for determining expected fields in navigation messages further comprises means for determining expected fields in navigation messages for at least two of the plurality of GPS satellites and wherein the means for receiving assistance information from a communication network comprises means for receiving the assistance information from a wireless communication network.

26. A system according to claim 25 wherein assistance information includes ephemeris information and wherein the means for determining expected fields in navigation messages further comprises means for determining expected fields in navigation messages associated with each of the at least two of the plurality of GPS satellites based on the received ephemeris information.

27. A system according to claim 26 wherein the means for determining expected fields in navigation messages further comprises means for determining expected fields in navigation messages associated with each of the at least two of the plurality of GPS satellites based on time-of-week information known to the mobile station.

28. A system for acquiring GPS timing information at a mobile station including a GPS receiver comprising:

means for receiving assistance information from a communication network;

means for acquiring a plurality of GPS satellites using the received assistance information;

means for determining expected information associated with at least one of the plurality of acquired GPS satellites;

means for correlating actual information received from the at least one of the plurality of acquired GPS satellites with the associated determined expected information for a plurality of delays to provide a quality indication for each of the plurality of delays;

means for determining the GPS timing information based on the quality indications; and wherein the means for determining expected information associated with at least one of the plurality of GPS satellites further comprises means for determining expected fields in navigation messages associated with each of the at least two of the plurality of GPS satellites based on calculated parity bit information.

29. A system for acquiring GPS timing information at a mobile station including a GPS receiver comprising:

means for receiving assistance information from a communication network;

means for acquiring a plurality of GPS satellites using the received assistance information;

means for determining expected fields in navigation messages associated with at least two of the plurality of acquired GPS satellites;

means for correlating actual information received from the at least two of the plurality of acquired GPS satellites with the associated determined expected information for a plurality of delays to provide a quality indication for each of the plurality of delays;

means for determining the GPS timing information based on the quality indications; and wherein the means for correlating actual information further comprises:

means for receiving the navigation messages from the at least two of the plurality of GPS satellites;

means for demodulating the received navigation messages at the plurality of delays to provide delay received fields for each of the plurality of delays;

means for correlating the delay received fields with the expected fields to provide the quality indication for each of the plurality of delays; and wherein the means for determining the GPS timing information comprises means for selecting one of the plurality of delays as the GPS timing information based on the quality indications.

30. A system according to claim 29 wherein the assistance information includes an assistance time reference and further comprising means for determining the plurality of delays based on an expected maximum delay time for receipt of the assistance time reference, at the mobile station.

31. A system according to claim 29 wherein the means for correlating the delay received fields further comprises:

means for establishing a buffer of expected current and upcoming symbols for each of the at least two of the plurality of GPS satellites from the corresponding expected fields;

means for initializing a correlation register for each of the at least two of the plurality of GPS satellites with an expected n most recent symbols for the respective GPS satellite, wherein the expected n most recent symbols are obtained from the corresponding buffer of expected current and upcoming symbols for the respective GPS satellite;

means for correlating coherent samples of the received navigation messages with the expected n most recent symbols for each of the at least two of the plurality of GPS satellites to provide a coherent correlation result for each of the plurality of delays;

means for shifting a next expected symbol into each of the correlation registers; and means for accumulating the coherent correlation results for each of the plurality of delays over a first accumulation period to provide the quality indication for each of the plurality of delays.

32. A system according to claim 31 further comprising:

means for converting the coherent correlation results to power values associated with each of the plurality of delays;

means for resetting the accumulated coherent correlation results; and means for accumulating the power values associated with each of the plurality of delays over a second accumulation period to provide the quality indication for each of the plurality of delays.

33. A system according to claim 29 further comprising:

means for adjusting a timing reference of the GPS receiver based on the GPS timing information; and means for determining a position of the mobile station based on the timing reference of the GPS receiver.

34. A system according to claim 29 wherein the means for acquiring a plurality of GPS satellites further comprises:

means for receiving transmissions from the plurality of GPS satellites;

means for synchronizing a timing of the GPS receiver with a boundary of a navigation message of a first acquired one of the plurality of GPS satellites based on the received transmissions to provide a first timing synchronization reference;

means for adjusting an expected timing for others of the plurality of GPS satellites based on the first timing synchronization reference; and means for acquiring the others of the plurality of GPS satellites based on their respective expected timing.

35. A system according to claim 34 wherein the assistance information includes an assistance time reference and ephemeris information and further comprising:

means for initializing the timing of the GPS receiver based on the assistance time reference;

means for determining GPS satellite acquisition parameters based on the ephemeris information and the assistance time reference; and means for acquiring the first acquired one of the plurality of GPS satellites based on the GPS satellite acquisition parameters.

* * * * *

UNITED STATES PATENT AND TRADEMARK OFFICE
CERTIFICATE OF CORRECTION

PATENT NO. : 6,295,023 B1
DATED : September 25, 2001
INVENTOR(S) : Bloebaum

It is certified that error appears in the above-identified patent and that said Letters Patent is hereby corrected as shown below:

<u>Title page,</u>
References Cited, please add the following references:

WO 99/19743 PCT dated 4/22/99
WO 99 57573 PCT dated 11/11/99
5,812,087 US to Krasner dated 9/22/98

<u>Column 18, claim 1,</u>
Please delete -- [information] --

Signed and Sealed this

Fifth Day of March, 2002

Attest:

JAMES E. ROGAN
*Attesting Officer*     *Director of the United States Patent and Trademark Office*